(12) United States Patent
Blease et al.

(10) Patent No.: US 7,056,373 B2
(45) Date of Patent: Jun. 6, 2006

(54) INK JET INK SET

(75) Inventors: James W. Blease, Avon, NY (US); LuAnn K. Weinstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 137 days.

(21) Appl. No.: 10/695,165

(22) Filed: Oct. 28, 2003

(65) Prior Publication Data

US 2005/0087099 A1    Apr. 28, 2005

(51) Int. Cl.
*C09D 11/02* (2006.01)
*B41J 2/01* (2006.01)

(52) U.S. Cl. .............. 106/31.27; 106/31.48; 106/31.5; 106/31.52; 347/100

(58) Field of Classification Search ........... 106/31.27, 106/31.48, 31.5, 31.52; 347/100
See application file for complete search history.

(56) References Cited

U.S. PATENT DOCUMENTS

| | | | | |
|---|---|---|---|---|
| 5,439,517 A | | 8/1995 | Yoshida et al. | 106/31.48 |
| 5,725,641 A | | 3/1998 | MacLeod | 106/31.5 |
| 5,851,273 A | * | 12/1998 | Morris et al. | 106/31.27 |
| 6,251,174 B1 | * | 6/2001 | Lavery et al. | 106/31.52 |
| 6,302,949 B1 | | 10/2001 | Peter | 106/31.52 |
| 6,342,096 B1 | | 1/2002 | Kurabayashi | 106/31.27 |
| 6,503,308 B1 | * | 1/2003 | Stramel et al. | 106/31.27 |
| 6,685,768 B1 | * | 2/2004 | Blease et al. | 106/31.47 |
| 6,749,674 B1 | * | 6/2004 | Geisenberger et al. | 106/31.52 |
| 2001/0027734 A1 | | 10/2001 | Geisenberger et al. | 106/31.52 |
| 2002/0121219 A1 | | 9/2002 | Stramel et al. | 106/31.27 |
| 2003/0061963 A1 | * | 4/2003 | Blease et al. | 106/31.27 |
| 2004/0074018 A1 | * | 4/2004 | Wuzik et al. | 8/543 |
| 2004/0128775 A1 | * | 7/2004 | Wuzik et al. | 8/583 |
| 2005/0076806 A1 | * | 4/2005 | Hanmura et al. | 106/31.48 |
| 2005/0229810 A1 | * | 10/2005 | Blease et al. | 106/31.5 |

FOREIGN PATENT DOCUMENTS

WO    WO 02/094943    * 11/2002

OTHER PUBLICATIONS

JP Abstract 59-129272, Jul. 1984.

* cited by examiner

*Primary Examiner*—Helene Klemanski
(74) *Attorney, Agent, or Firm*—Doreen M. Wells; Sarah Meeks Roberts

(57) ABSTRACT

An ink jet ink comprising: a) at least one first metal complex black dye that when printed alone on a receiving element gives a CIELAB a* value>0 and at 1.0 Status A visual density; b) at least one second metal complex black dye that when printed alone on a receiving element gives a CIELAB a* value<0 and at 1.0 Status A visual density; and c) at least one yellow azo-aniline yellow dye or metal complex yellow dye or mixtures thereof.

23 Claims, 8 Drawing Sheets

INK JET INK SET

CROSS REFERENCE TO RELATED APPLICATION

Reference is made to commonly assigned, co-pending U.S. patent application Ser. No. 10/695,119 by James Blease et al., filed of even date herewith entitled "Ink Jet Ink Set".

FIELD OF THE INVENTION

This invention relates to black inks for ink jet printing that provide black images with neutral tone and good light fastness on laminated media.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier recording materials include water, mixtures of water and organic co-solvents and high boiling organic solvents, such as hydrocarbons, esters, ketones, etc.

For aqueous dye-based inks, the dyes needs to be sufficiently soluble in water to prepare a solution that is capable of producing adequate density on the receiving element and stable for extended periods of storage without precipitation.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photo-realistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks. In addition to the light absorption characteristics of the dyes, the maximum print density achieved from the ink is another important factor to provide a high color gamut. The higher the print density the greater the color gamut.

For printing black and white images with high detail, a black ink can be used to produce different levels of gray. In this case, is important to maintain a near neutral tone over the entire density scale. One method of assessing the tone of a black or gray patch is to measure the printed image in CIELAB color space, specifically a* and b* values.

It is also important to use inks in the ink jet ink set which are resistant to light fade to preserve the printed image. Of particular importance is the light fastness of the inks when printed on recording materials which is subsequently sealed with a laminating film. Lamination is done to protect the printed image from physical damage and also to further enhance the stability of the printed image against light fade and fade due to environmental pollutants such as ozone. Laminate films are available in a variety of forms and can be categorized based on their mode of adhesion to the printed recording materials. These forms include heat activated laminates, thermal laminates and pressure sensitive laminates. Laminate films can contain ultraviolet light absorbing compounds which can in part protect the printed dyes from fade due to ultraviolet light.

U.S. Pat. No. 5,439,517 describes the addition of yellow dyes (such as C.I. Direct Yellow 132 and C.I. Direct Yellow 86) to black ink containing a black disazo dye to adjust the tone of the black ink on the receiving element. However, the light fastness of this class of black dyes on a laminated receiving element is not as high as one would like. U.S. Patent Application 2002/0121219 describes a mixture of two black dyes; Pacified Reactive Black 31 and C. I. Direct Black 168 to improve the black ink tone and thus provide a more neutral image. However, the light fastness of Direct C. I. Black 168 on a laminated receiving element is not as high as one would like (as shown in the comparative examples below). Japanese Patent Publication No. 59-129272 describes black inks for ink jet printing which contain both black dyes and black pigments. U.S. Pat. No. 6,342,096 describes combinations of black pigment, a black dye, and cyan dye to provide a more neutral tone. However the light fastness of the example black dyes described (for example C. I. Food Black 2, C. I. Direct Black 195, C.I. Direct Black 168) are not a high as one would like. In addition, ink sets combining black pigment inks with cyan, magenta and yellow dye inks can produce images with undesirable image artifacts. An example of such an artifact is a gloss difference in areas printed with black pigment inks on a glossy receiving element versus areas printed only with dye inks.

Metal complex black dyes have been disclosed with good light fastness on receiving element that are subsequently laminated after printing. For example, U.S. Pat. No. 5,725, 641 discloses Pacified Reactive Black 31 which is a copper complex black dye. U.S. Pat. No. 6,302,949 discloses metal complex bisazo black dyes. U.S. Patent Application No. 2001/0027734A1 discloses metal complexes of trisazo black dyes. However, used as the sole colorant in an ink jet ink, these metal complex black dyes do not provide as neutral a tone as a function of print density as one would like.

It is an object of this invention to provide a black ink for ink jet printing capable of producing images with near neutral tone over a range of densities while providing high light fastness when printed on a variety of recording elements that are subsequently laminated. Another object of this invention is to provide a black ink of a color ink jet ink set with near neutral tone over a range of densities while providing high light fastness when printed on a variety of recording elements that are subsequently laminated.

SUMMARY OF THE INVENTION

Figure 1:
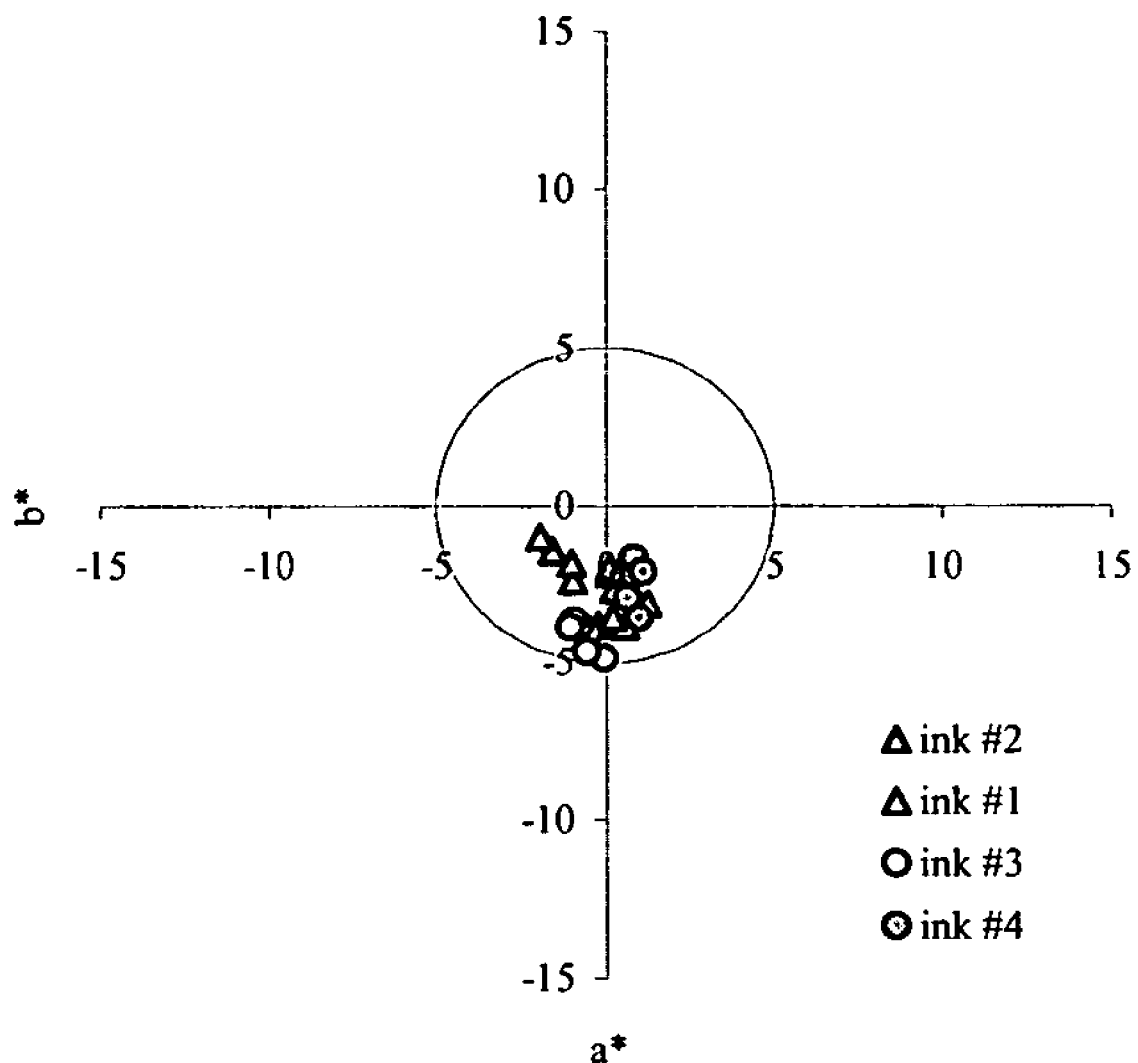
FIGS. 1 and 2 are graphs that show respectively the results for inventive inks 1 through 4 printed on Kodak Instant Dry Glossy Media and Kodak Reverse Print Back-Lit Film after lamination.
Figure 2:
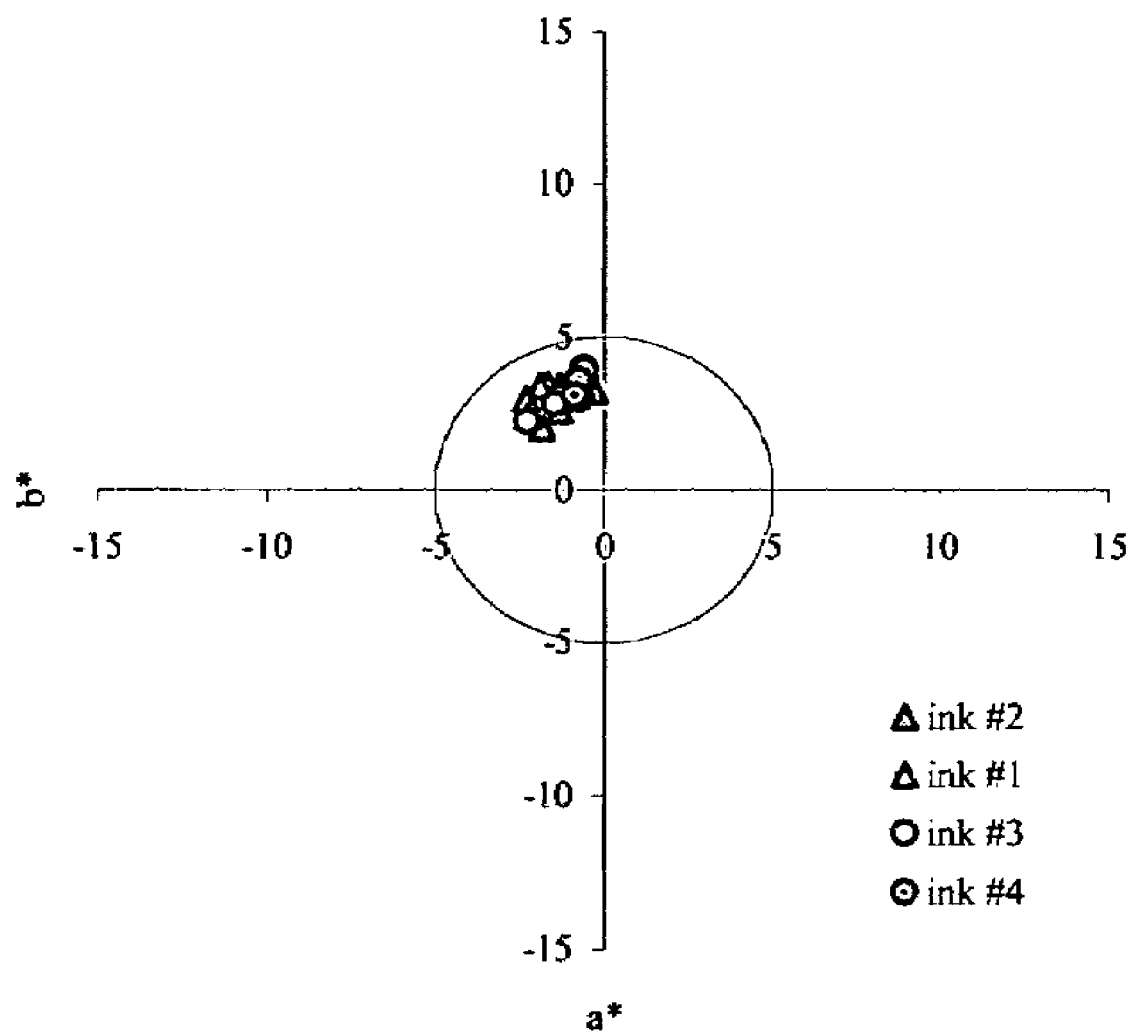
Figure 3:
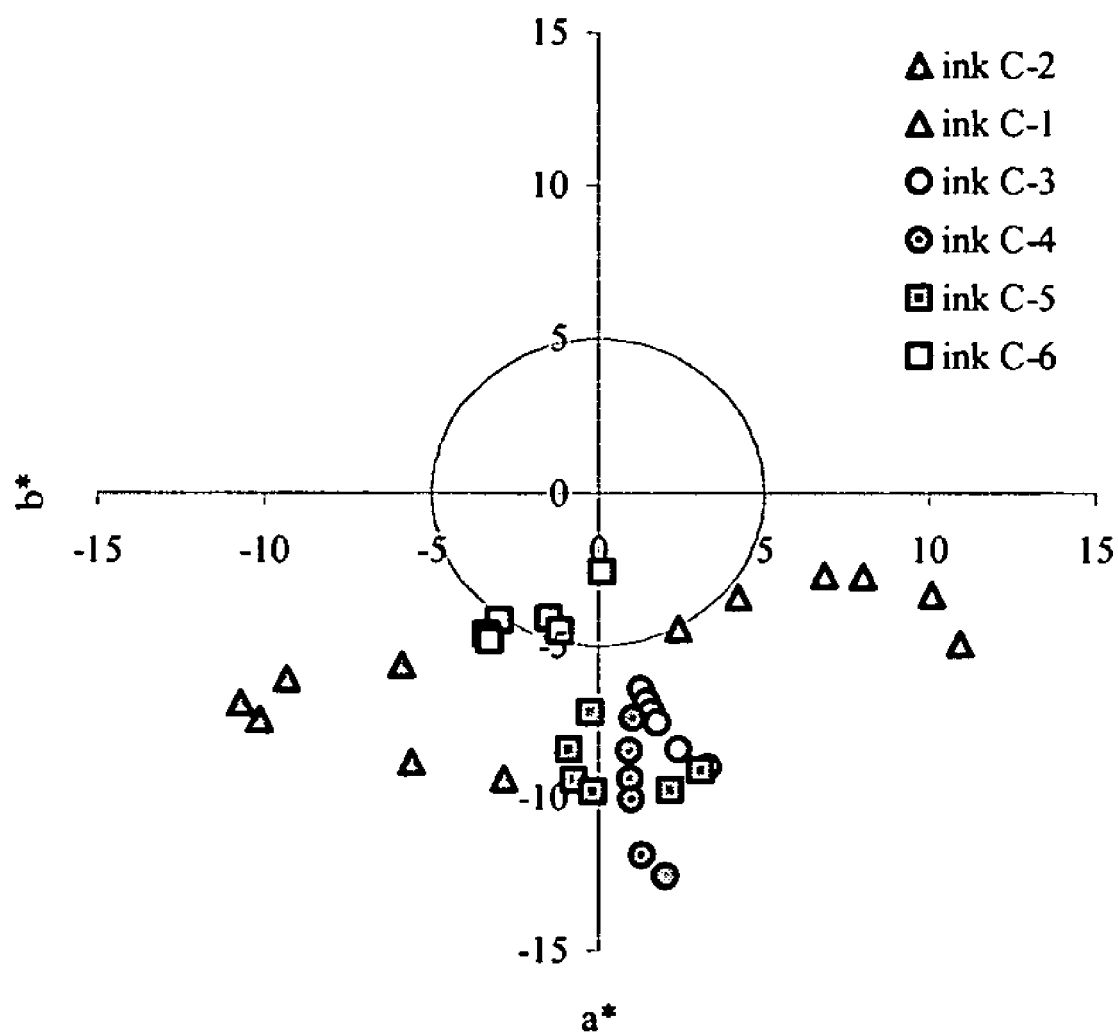
FIGS. 3 and 4 are graphs that show respectively the results for comparative inks C-1 through C-6 on Kodak Instant Dry Glossy Media and Kodak Reverse Print Back-Lit Film.
Figure 4:
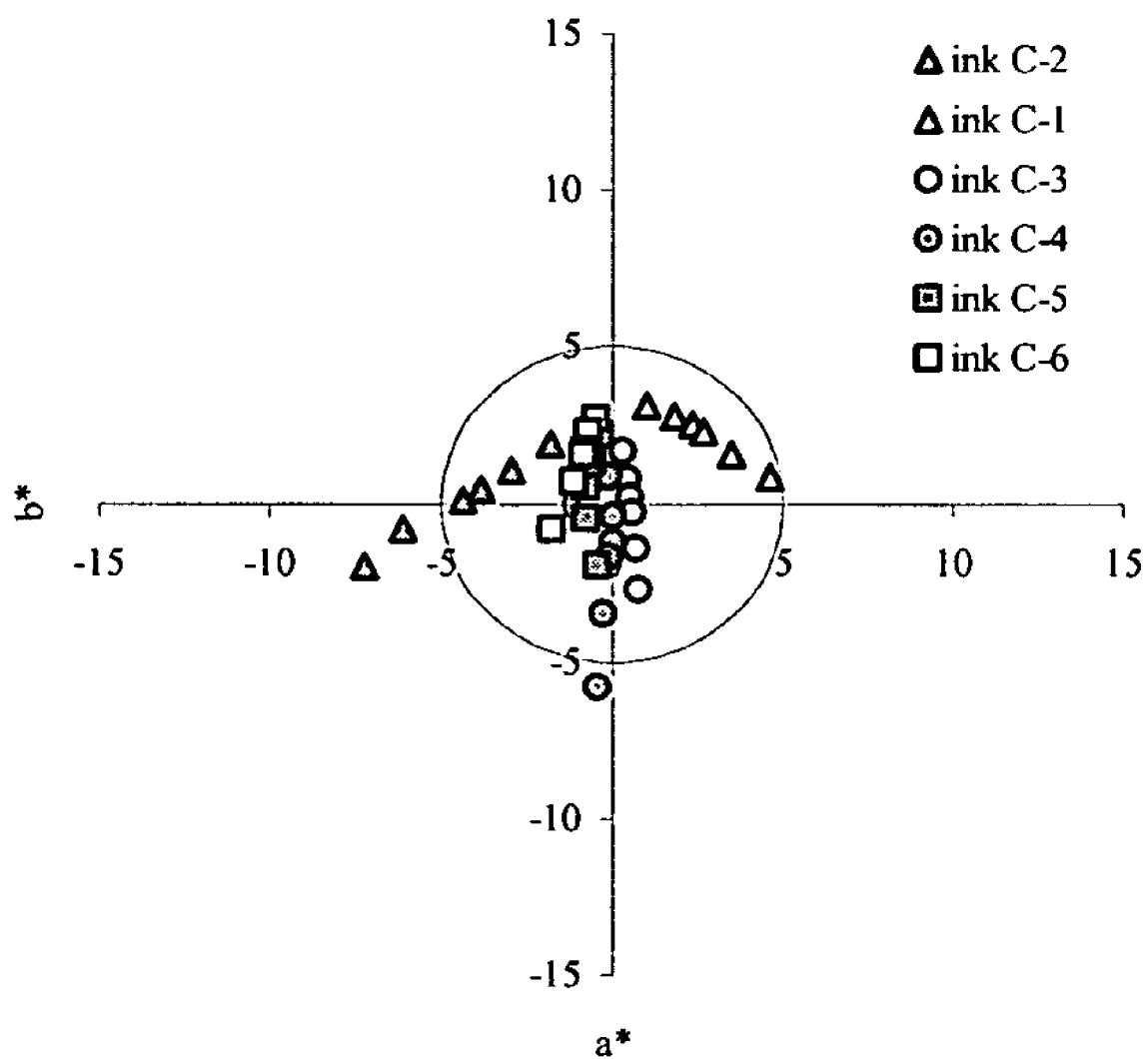
Figure 5:
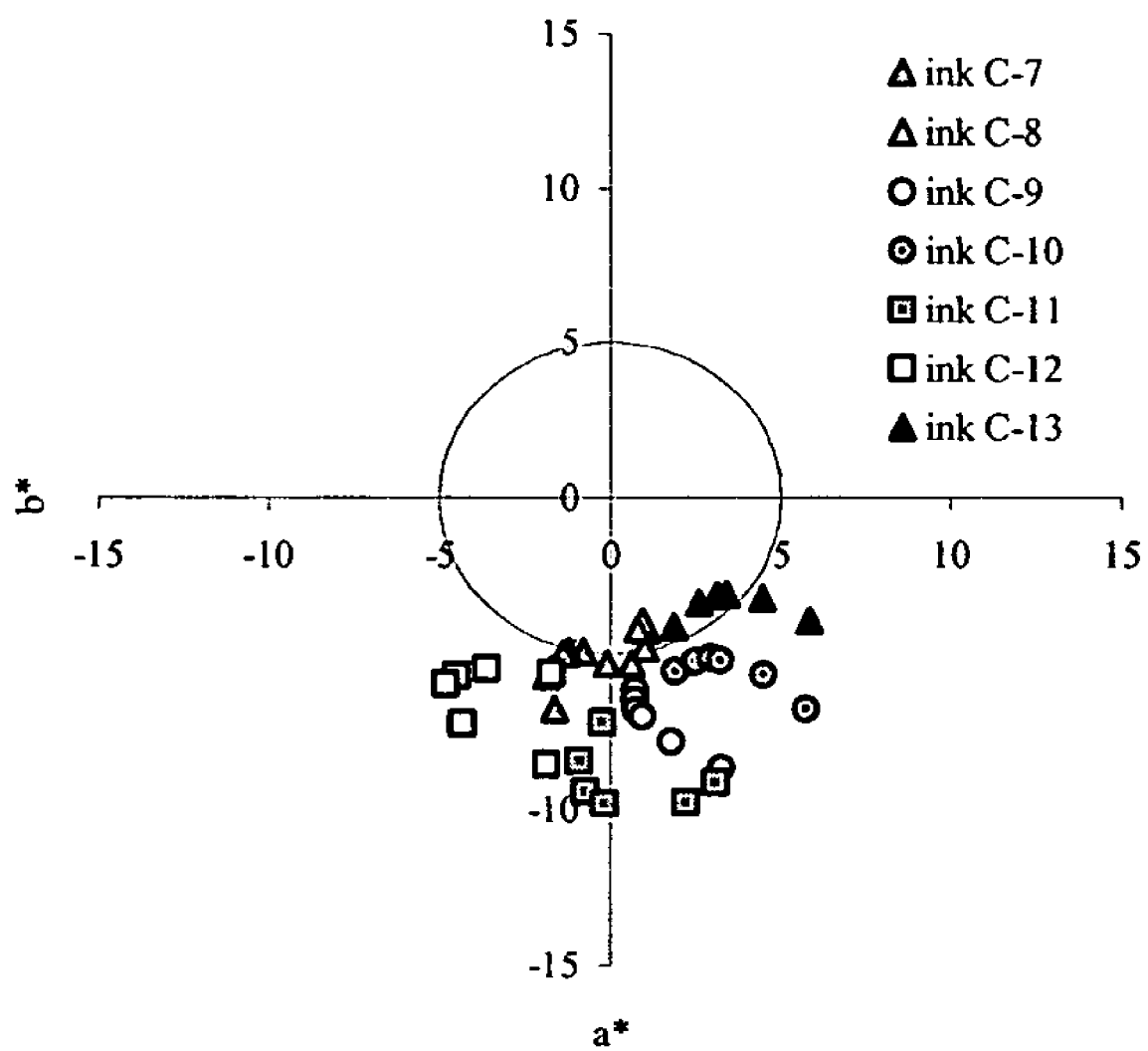
FIGS. 5 and 6 are graphs that show respectively the results for comparative inks C-7 through C-13 on Kodak Instant Dry Glossy Media and Kodak Reverse Print Back-Lit Film.
Figure 6:
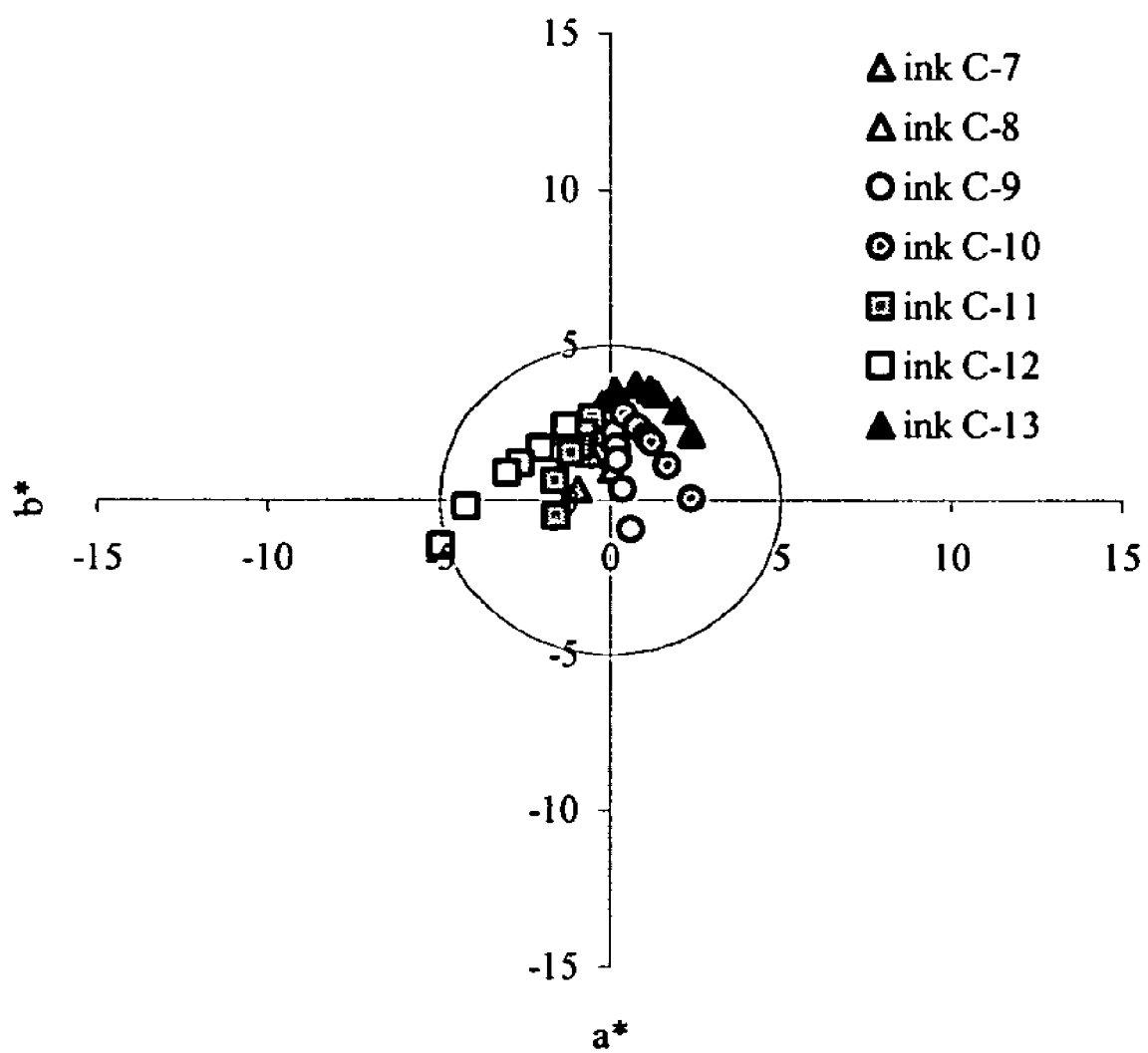
Figure 7:
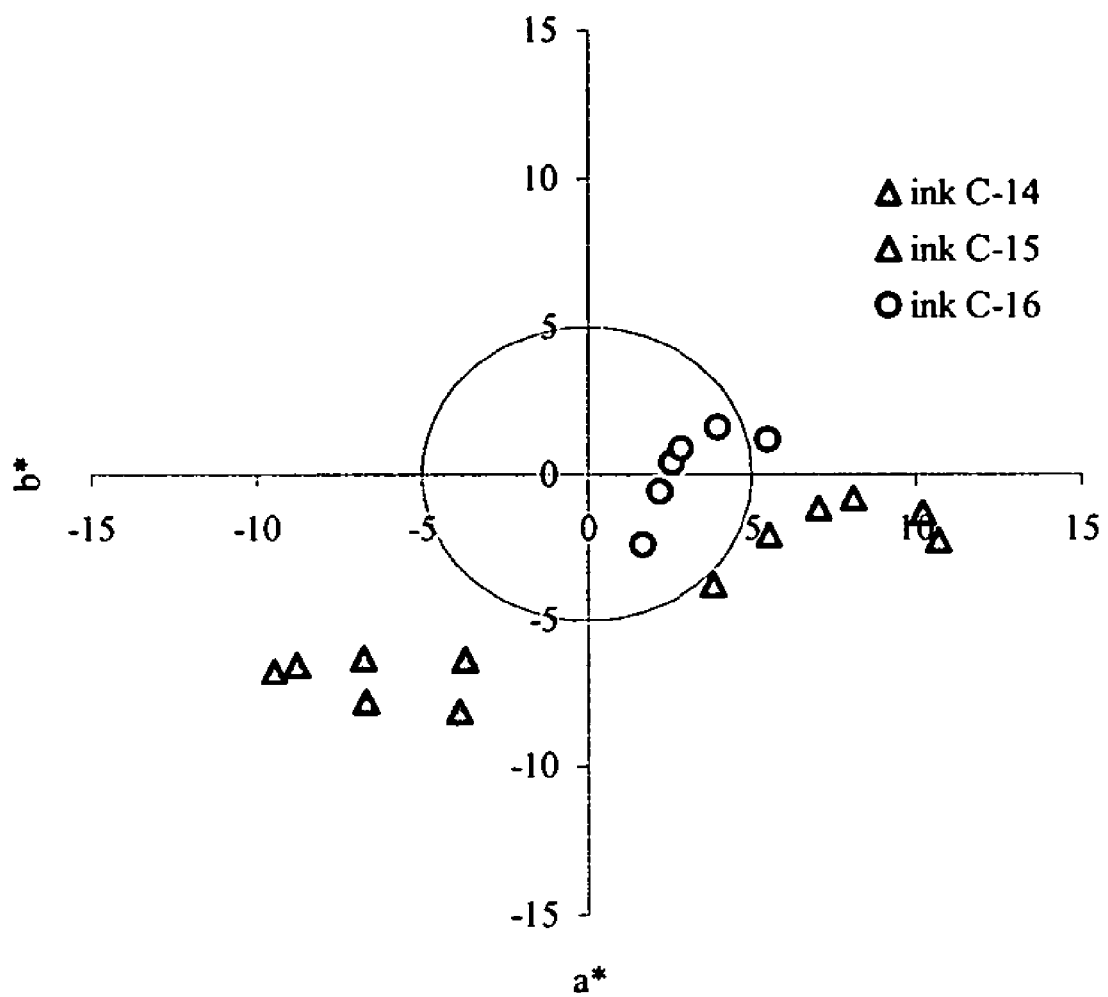
FIGS. 7 and 8 are graphs that show respectively the results for comparative inks C-14 through C-16 on Kodak Instant Dry Glossy Media and Kodak Reverse Print Back-Lit Film.
Figure 8:
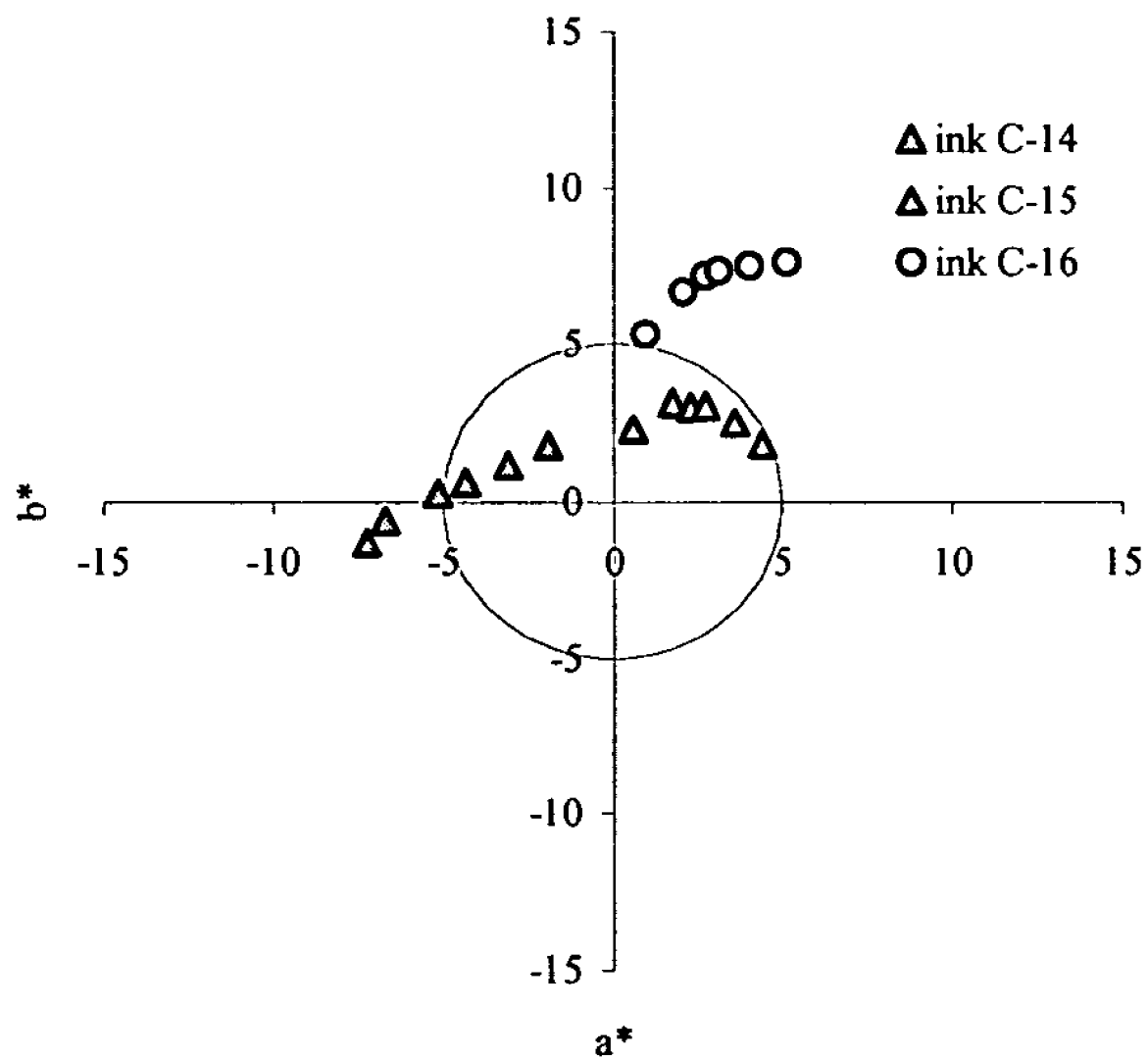

Accordingly, the present invention provides a black ink composition for ink jet printing comprising:
  a) at least one first metal complex black dye that when printed alone on a receiving element gives a CIELAB a* value>0 and at 1.0 Status A visual density;
  b) at least one second metal complex black dye that when printed alone on a receiving element gives a CIELAB a* value<0 and at 1.0 Status A visual density;
  c) and at least one yellow azo-aniline yellow dye or metal complex yellow dye or mixtures thereof.

In another embodiment of the present invention, an ink jet ink set comprises;
  a) a cyan ink comprising a cyan dye and a carrier,
  b) a magenta ink comprising a magenta dye and a carrier,
  c) a yellow ink comprising a yellow dye and a carrier,
  d) a black ink comprising a carrier and,
    i) at least one first metal complex black dye that when printed alone on a receiving element gives a CIELAB a* value>0 and at 1.0 Status A visual density;
    ii) at least one second metal complex black dye that when printed alone on a receiving element gives a CIELAB a* value<0 and at 1.0 Status A visual density;
    iii) and at least one yellow azo-aniline yellow dye or metal complex yellow dye or mixtures thereof.

The ratio of the first metal complex black dye(s) to second metal complex black dye(s) in the ink composition is from 1:19 to 19:1, more preferably 1:9 to 9:1. The ratio of yellow dye(s) to the sum of the black dyes in the ink composition is from 1:3 to 1:99 more preferably 1:19 to 1:5.

DETAILED DESCRIPTION OF THE INVENTION

The black ink of the invention may be used alone or in an ink jet ink set with cyan, magenta and yellow inks.

Any first metal complex black dye with a CIELAB a* value>0 at 1.0 Status A visual density combined with any metal second complex black dye with a CIELAB a* value<0 at 1.0 Status A visual density combined with any azo-aniline or metal complex yellow dye may be used in the black ink of the invention.

In a preferred embodiment the first black dye is C. I. Reactive Black 31 or Pacified Reactive Black 31, the latter selected from among the following structures:

(I)

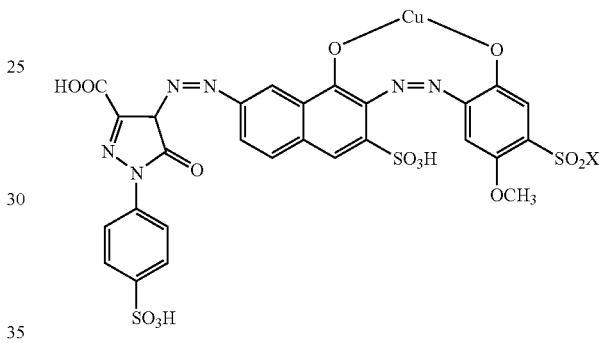

where X is —CH$_2$CH$_2$—OH, —CH=CH$_2$, an alkylamino group or a substituted alkylamino group such as —CH$_2$CH$_2$N(CH$_2$CH$_2$—OH)$_2$, —CH$_2$CH$_2$NCH$_3$(CH$_2$CH$_2$—OH), —CH$_2$CH$_2$NCH$_3$(CH$_2$CH$_2$—SO$_3$Na), —CH$_2$CH$_2$NCH$_3$(CH$_2$COONa), an alkylsulfo group or substituted alkylsulfo group, or mixtures thereof or dimeric forms represented by structures II and III;

(II)

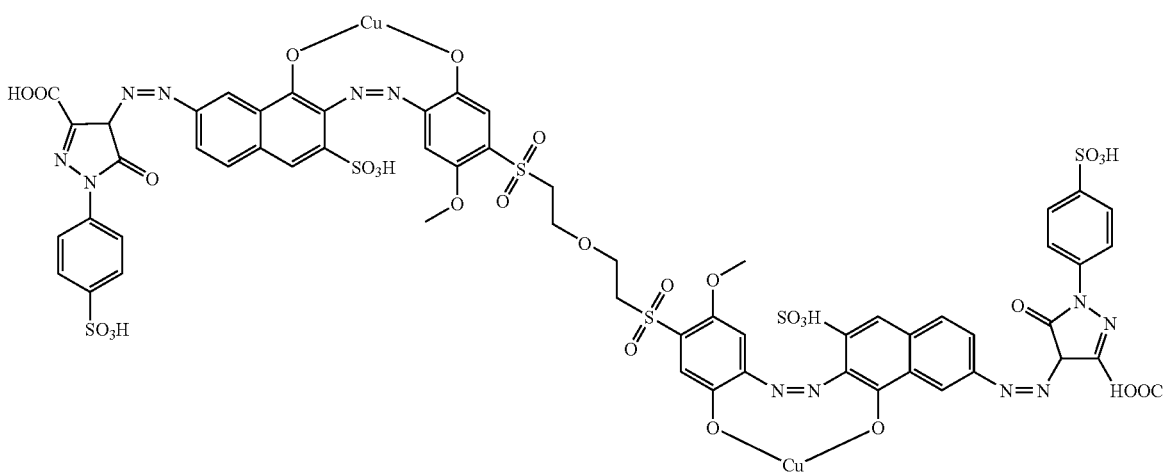

-continued

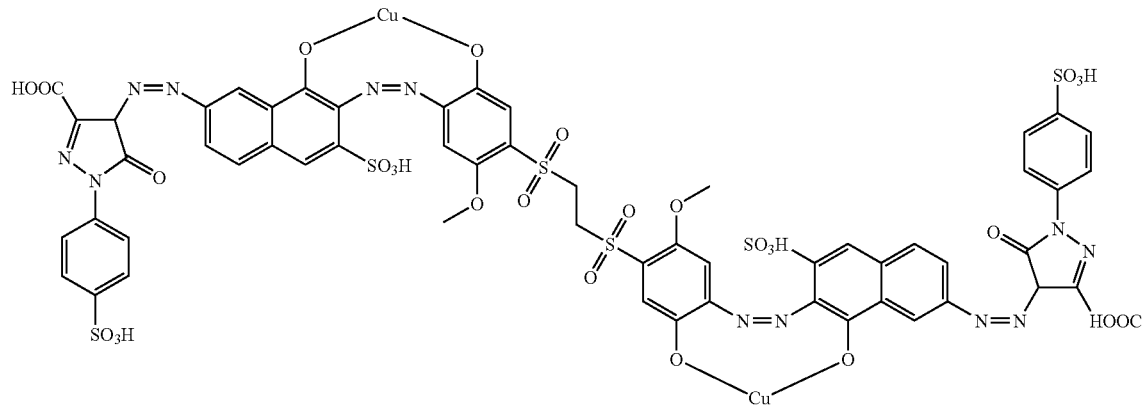

(III)

or mixture of II and III; or mixtures in any proportion of I, II, or III. A chromium complex or cobalt complex black dye having an a* value of >0 at 1.0 Status A visual density may also be combined in a mixture with structures I, II or III above.

The second black dye is a metal complex bisazo black dye of the following structure:

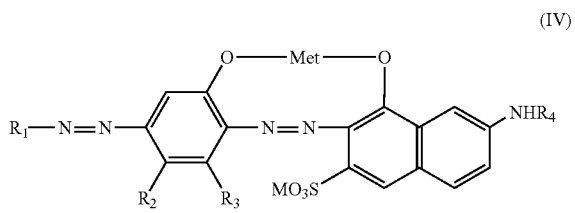

(IV)

where $R_1$ is unsubstituted or substituted phenyl or unsubstituted or substituted naphthyl; $R_2$ is H, alkyl, substituted alkyl, alkoxy, substituted alkoxy all with 1 to 18 C atoms, amino, substituted amino, halo, trifluoromethyl, carboxy, sulfo, carbamido, alkylcarbonylamino, arylcarbonylamino; or $R_2$ forms together with $R_3$ and the phenylene ring a 1,4-naphthylene moiety, which can be unsubstituted or substituted in position 6 or 7; $R_4$ is H, alkyl, substituted alkyl, all with 1 to 18 C atoms, cycloalkyl, unsubstituted or substituted heterocyclic alkyl, unsubstituted or substituted aryl, unsubstituted or substituted aralkyl, saturated or unsaturated aza and/or oxa and/or heterocyclic radicals; M is hydrogen, a metal cation, preferentially an alkali metal cation, an ammonium cation, or an ammonium cation substituted with alkyl, alkoxyalkyl or hydroxyalkyl radicals each having 1 to 12 C atoms; and Met is Cu, Ni, or Zn, of the structures as described in U.S. Pat. No. 6,302,949 col. 5–6, the disclosure of which is incorporated herein by reference.

The second metal complex black dye may also be selected from trisazo metal complex black dyes of the following structure:

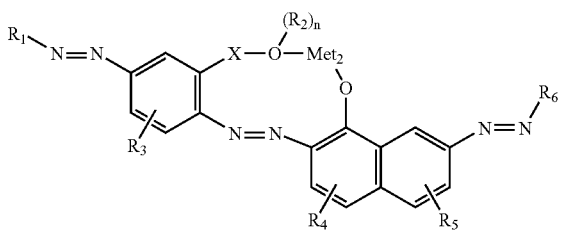

(V)

where $Met_2$ is a metal atom, preferably Al, Co, Cr, Cu, Fe, or Ni; $R_1$ is a phenyl or naphthalene radical substituted by 1, 2 or 3 substituents selected from the group consisting of OH, O(C1–C6)-alkyl, COOM, $SO_3M$ and $NH_2$; $R_2$ is C1–C6 alkyl, n is 0 or 1, X is a chemical bond or —CO— or —$SO_2$—; $R_3$ is H, methyl or O(C1–C6) alkyl; $R_4$ and $R_5$ are each H, COOM or $SO_3M$; $R_6$ is a phenyl, pyridyl or pyrazole radical substituted by 1, 2 or 3 substituents selected from the group consisting of OH, O(C1–C6)-alkyl, COOM, $SO_3M$, $NH_2$, NHaryl, NHacyl and phenylsulfo; and M is ammonium, H, K, Li, or Na, the structures as described in U.S. Patent Application Publication No. 2001/0027734A1, at page 2, the disclosure of which is incorporated herein by reference. A mixture of structures IV and V may also be used as the second metal complex black dye. A chromium complex or cobalt complex black dye having an a* value of >0 at 1.0 Status A visual density may also be combined in mixtures with structures IV or V above.

The yellow dye of the black ink is an azoaniline yellow dye or metal complex yellow dye or mixtures thereof.

In a preferred embodiment, the first metal complex black dye is a Pacified Reactive Black 31, or C. I. Acid Black 52, or mixtures thereof, the second metal complex black dye is a bisazo metal complex black dye of structure (IV) of which Ilford K-1334 black dye is an example, or the second metal complex black dye is a trisazo metal complex black dye of structure (V) of which Clariant Duasyn® NB-SF is an example, or mixtures thereof and the yellow dye is C.I. Direct Yellow 86, C.I. Direct Yellow 107, C. I. Direct Yellow 132, or C.I. Direct Yellow 173 and the yellow metal complex yellow dye is C.I. Acid Yellow 99 or C. I. Acid Yellow 114.

In a yet more preferred embodiment, the first metal complex black dye is a dimeric form (structures II or III) of Pacified Reactive Black 31 and the second metal complex black dye is Clariant Duasyn® NB-SF black dye or Ilford K-1334 black dye and C.I. Direct Yellow 86.

The above described inventive black ink can be part of an ink jet ink set which also includes a cyan, magenta and yellow ink. Any cyan dye or combination of cyan dyes may be used in the cyan ink of the invention. In a preferred embodiment the cyan dye is a sulfonated copper phthalocyanine cyan dye or mixture thereof. In a more preferred embodiment the cyan dye is C. I. Direct Blue 86, C. I. Direct Blue 199, Bayer Bayscript® BA, BASF Basacid® 762, or C. I. Direct Blue 307 (available as Avecia Pro-Jet™ Fast Cyan 2).

Any magenta dye or combination of magenta dyes may be used in the magenta ink of the invention. In a preferred embodiment the magenta dye is a metal complex magenta dye or anthrapyridone magenta dye or azo-naphthol derived magenta dye or mixtures thereof may be used in the magenta ink. In a more preferred embodiment the metal complex magenta dye is Kodak Lightfast Magenta 1 (CAS # 251959-65-6), C. I. Reactive Red 23, pacified C. I. Reactive Red 23, the azo-naphthol derivative magenta dye is C. I. Reactive Red 31, pacified Reactive Red 31, or Ilford Magenta 377 (CAS # 182061-89-8), and the anthrapyridone magenta dye is Nippon Kayaku JPD EK-1 (CAS # 224628-70-0), Acid Red 80, Acid Red 82, or CAS# 212080-60-9.

Any yellow dye or combination of yellow dyes may be used in the yellow ink of the invention. In a preferred embodiment the yellow dye is an azoaniline yellow dye or metal complex yellow dye or mixtures thereof. In a more preferred embodiment the yellow azo-aniline dye is C.I. Direct Yellow 86, C.I. Direct Yellow 107, C. I. Direct Yellow 132, or C.I. Direct Yellow 173 and the yellow metal complex yellow dye is C.I. Acid Yellow 99 or C. I. Acid Yellow 114.

The ink jet ink set can be expanded to include for example a light cyan ink and a light magenta ink. The ink jet ink set can be further expanded to include a light yellow ink and a light black (gray) ink. Any other dye or mixtures thereof may be used to prepare inks of other colors to expand the ink jet ink set such as green, orange, or violet.

In general, the inks of this invention comprise the above dyes at total concentrations of from 0.1 to 15.0%, preferably from 0.4 to 6% by weight of the ink jet ink composition.

A humectant is usually employed in the ink jet compositions of the invention to help prevent the ink from drying out or crusting in the orifices of the print head. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP), 1,5 pentanediol, 1,2-hexanediol, 1,2,6-hexanetriol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether (DEGMBE); nitrogen-containing compounds, such as urea, pyrrolidin-2-one, N-methyl-pyrrolidin-2-one, and 1,3-dimethyl-2-imidazolidinone; and sulfur-containing compounds such as dimethyl sulfoxide, thioglycol, and tetramethylene sulfone.

Preferred humectants for the inks of the invention include DEG, glycerol, DEGMBE, TEGMBE, 1,2-hexanediol, 1,5-pentanediol, urea, pyrrolidin-2-one, EHMP and mixtures thereof. The humectant may be employed in each ink in an amount of from 5 to 60 weight percent.

Water-miscible organic solvents may also be added to the aqueous inks of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 40 to 98 weight %, preferably approximately 70 to 98 weight %, based on the total weight of the ink. A mixture of water and a polyhydric alcohol, such as diethylene glycol, is useful as an aqueous carrier. In a preferred embodiment, the inks contain from 5 to 60 weight % of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, defoamers, anti-corrosion aids, viscosity modifying polymers, or sequestrants.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLES

Preparation of Inks

Inks used in the invention and control inks were prepared by simple mixing of the ingredients. After thorough mixing, each ink was filtered with a 0.2 micron filter. The inks shown in Table 1 were prepared.

TABLE 1

| ink # | | Dye | Wt. % dye in ink |
|---|---|---|---|
| 1 | 1st black dye | Pacified Reactive Black 31[a] | 2.40 |
|   | 2nd black dye | Duasyn ® NB-SF[b] Direct | 1.20 |
|   | yellow dye | Yellow 86[c] | 0.40 |
| 2 | 1st black dye | Pacified Reactive Black 31[a] | 2.52 |
|   | 2nd black dye | Duasyn ® NB-SF[b] | 1.28 |
|   | yellow dye | Direct Yellow 132[d] | 0.20 |
| 3 | 1st black dye | Acid Black 52[e] | 3.20 |
|   | 2nd black dye | Duasyn ® NB-SF[b] | 0.40 |
|   | yellow dye | Direct Yellow 86[c] | 0.40 |
| 4 | 1st black dye | Pacified Reactive Black 31[a] | 1.40 |
|   | 2nd black dye | Ilford K-1334[f] | 2.00 |
|   | yellow dye | Direct Yellow 86[c] | 0.60 |

[a] available from Sensient Technical Colors, Inc. as a 10 wt. % dye solution in water
[b] available from Clariant Corp., a 10 wt. % dye solution in water
[c] available as a 10 wt. % dye solution in water from Sensient Technical Colors, Inc.
[d] available as Pro-Jet ® Yellow 1G from Avecia, Inc., a 7.5 wt. % dye solution in water
[e] available from H. W. Sands Corp. as a 10 wt. % dye solution in water
[f] available as a 10 wt. % dye solution in water from Ilford Imaging, GmbH In addition to the dyes, all of the inks in Table 1 were prepared with 23 wt. % glycerol, 7.0 wt. % triethylene glycol mono-butyl ether, 0.3 wt. % triethanolamine and 0.09 wt. % lactic acid with the balance being water.

As comparative examples, the inks in Table 2 were prepared.

TABLE 2

| ink # | dye #1 | wt. % dye #1 | dye #2 | wt. % dye #2 | dye #3 | wt. % dye #3 |
|---|---|---|---|---|---|---|
| C-1 | Pacified Reactive Black 31 | 4.00 | — | | — | |
| C-2 | Duasyn ® NB-SF | 4.00 | — | | — | |
| C-3 | C. I. Acid Black 52 | 4.00 | — | | — | |
| C-4 | Ilford K-1334 | 4.00 | — | | — | |
| C-5 | C. I. Direct Black 168[g] | 4.00 | — | | — | |
| C-6 | C. I. Food Black 2[h] | 4.00 | — | | — | |
| C-7 | Pacified Reactive Black 31 | 1.32 | C. I. Direct Black 168[g] | 2.68 | — | |
| C-8 | Pacified Reactive Black 31 | 2.68 | C. I. Direct Black 168[i] | 1.32 | — | |
| C-9 | Pacified Reactive Black 31 | 1.32 | C. I. Food Black 2[h] | 2.68 | — | |
| C-10 | Pacified Reactive Black 31 | 2.68 | C. I. Food Black 2[h] | 1.32 | — | |
| C-11 | Pacified Reactive Black 31 | 1.32 | Duasyn ® NB-SF | 2.68 | — | |
| C-12 | Pacified Reactive Black 31 | 2.68 | Duasyn ® NB-SF | 1.32 | — | |
| C-13 | Pacified Reactive Black 31 | 2.00 | C. I. Acid Black 52 | 2.00 | — | |

TABLE 2-continued

| ink # | dye #1 | wt. % dye #1 | dye #2 | wt. % dye #2 | dye #3 | wt. % dye #3 |
|---|---|---|---|---|---|---|
| C-14 | Duasyn ® NB-SF | 3.80 | C. I. Direct Yellow 86 | 0.20 | — | |
| C-15 | Pacified Reactive Black 31 | 3.80 | C. I. Direct Yellow 86 | 0.20 | — | |
| C-16 | Pacified Reactive Black 31 | 2.60 | C. I. Direct Black 168$^g$ | 1.20 | C. I. Direct Yellow 86 | 0.20 |

$^g$available as Pro-Jet ® Direct Black 168 from Avecia, Inc., a 10 wt. % dye solution in water
$^h$available from Sensient Technical Colors as a 10 wt. % dye solution in water In addition to the dyes, all of the inks in Table 2 were prepared with 23 wt. % glycerol, 7.0 wt. % triethylene glycol mono-butyl ether, 0.3 wt. % triethanolamine and 0.09 wt. % lactic acid with the balance being water.

To evaluate the inks of the invention and the comparative inks, each ink was placed in an ink cartridge for a Canon Model S520 printer and printed using the Canon model S520 printer. A density scale was created by printing areas at 10%, 25%, 40%, 50%, 75% and 100% dot coverage. The inks of the invention and the comparative inks were printed onto Kodak Instant Dry Glossy/220 g media and Kodak Reverse Print Back-Lit Film/6 mil. These two image recording elements were chosen for their significantly different intrinsic tone and mode of viewing (the former is viewed in a reflective mode while the latter is viewed in a transmission mode). Approximately 1 day after printing, the printed media were laminated using Kodak Low-Heat Pro Lustre Laminate/2.6 mil film.

Each density patch was measured for The Status A visual density and CIELab L*, a* and b* values using a MacBeth-Gretag Spectrolino densitometer with D6500 illuminant, 2 degree observer angle, and no filter. The Kodak Instant Dry Glossy media was read in reflection mode, the Kodak Reverse Print Back-Lit Film was read in transmission mode. Table 3 provides the a* values at 1.0 status A visual density on both receiving elements for inks C-1 through C-4 which contain only one metal complex black dye.

TABLE 3

| | | a* @ 1.0 Status A Visual Density | |
|---|---|---|---|
| ink # | Dye | Kodak Instant Dry Glossy Media | Kodak Reverse Print Back-Lit Film |
| C-1 | Pacified Reactive Black 31 | 8.8 | 3.0 |
| C-2 | Duasyn ® NB-SF | −10.0 | −4.3 |
| C-3 | C. I. Acid Black 52 | 2.1 | 0.6 |
| C-4 | Ilford K-1334 | −0.3 | −0.7 |

The results in Table 3 indicate that when black metal complex dyes are used as the sole dye in ink jet inks, a* values are observed that can range from negative to positive depending on the nature of the black dye. These results also indicate which combinations of metal complex black dyes offer improved black ink tone (i.e. mixtures of black dyes created from a dye with a positive a* value and a dye with a negative a* value).

It is desired that in order to maintain a black image of relatively neutral tone a black ink printed on both types of laminated recording elements meet the following equation:

$$[(a^*)^2+(b^*)^2]^{1/2} \leq 5$$

The equation defines a circular area in a*, b* coordinates in which all dot coverage levels (in other words density levels) of the black ink should fall in order to meet the requirement of relatively neutral hue.

Inventive inks 1 through 4 meet the neutral tone requirement (they fall within the circle at each density step) on both types of laminated ink-jet receiving elements. None of the comparative inks C-1 through C-16 were able to meet the neutral tone requirement simultaneously on the two types of ink-jet receiving elements.

After measuring, the printed and laminated media were exposed to 50 kilolux simulated daylight radiation for one week. Each density patch was then re-read after the high intensity exposure to assess the light fastness of each density patch. High intensity exposure such as this is intended to provide an accelerated response to normal use conditions wherein the light exposure is of much lower intensity but the exposure is for a much longer duration. It is desired for each ink of the ink set to fade less than 5% in density from a starting status A visual density of 1.0 on one or both of the media types used to evaluate the inks. The percent change in density from an initial starting density of 1.0 was determined by linear interpolation between areas with starting densities which were less than and greater than 1.0 density. Results for inks 1 through 4 of the invention and comparative inks C-1 through C-16 are shown in table 4. The letter A indicates a fade response of 5% or less, the letter B indicates a fade of 6 to 10% and the letter C more than 10%.

TABLE 4

| ink # | % density loss from 1.0 initial density, Kodak Instant Dry Media | % density loss from 1.0 initial density, Kodak Back-Lit Film |
|---|---|---|
| 1 | A | A |
| 2 | A | A |
| 3 | A | A |
| 4 | A | A |
| C-1 | A | A |
| C-2 | A | A |
| C-3 | A | A |
| C-4 | A | A |
| C-5 | C | C |
| C-6 | C | C |
| C-7 | C | C |
| C-8 | B | B |
| C-9 | B | C |
| C-10 | A | B |
| C-11 | A | A |
| C-12 | A | A |
| C-13 | A | A |
| C-14 | A | A |
| C-15 | A | A |
| C-16 | B | B |

Inspection of Table 4 shows that all of the inks of the invention met the fade specification of less than 5% density loss from a starting density of 1.0. While some of the comparative inks meet the fade specification (inks C-1 through C-4 and C-11 through C-15) none of the comparative example inks meet both the neutral tone specification and fade specification. Inks containing a substantial portion of the total dye as a non-metal complex black dye (inks C-5 through C-10 and C-16) fail to meet both tone and fade specifications.

The invention has been described in detail with particular reference to useful embodiments thereof, but it will be understood that variations and modifications can be effected within the spirit and scope of the invention.

What is claimed is:

1. An ink jet ink comprising:
   a) at least one first metal complex black dye that when printed alone on a receiving element gives a CIELAB a* value>0 and at 1.0 Status A visual density;
   b) at least one second metal complex black dye that when printed alone on a receiving element gives a CIELAB a* value<0 and at 1.0 Status A visual density; and
   c) at least one yellow azo-aniline yellow dye or metal complex yellow dye or mixtures thereof.

2. An ink jet ink according to claim 1 wherein the first metal complex black dye is C. I. Reactive Black 31 or Pacified Reactive Black 31, the latter selected from among the following structures:

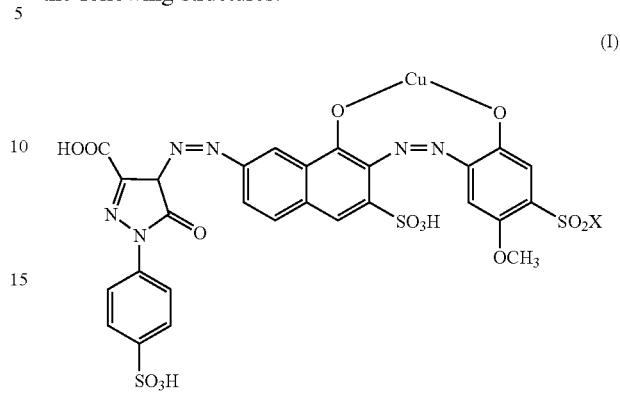

(I)

where X is —$CH_2CH_9$ or —$CH=CH_2$, an alkylamino group or a substituted alkylamino group, an alkylsulfo group or substituted alkylsulfo group, or mixtures thereof; or dimeric forms represented by structures II and III;

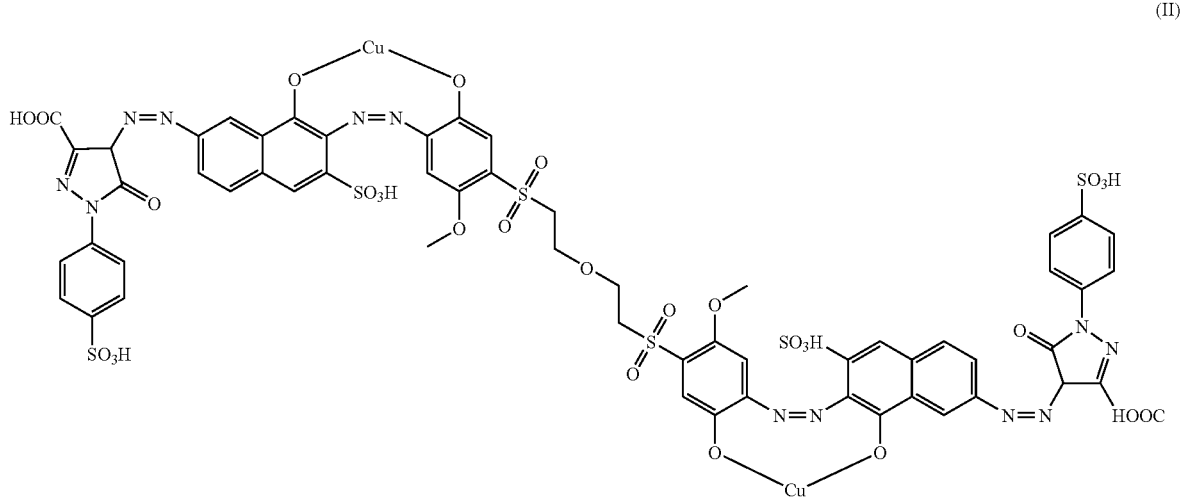

(II)

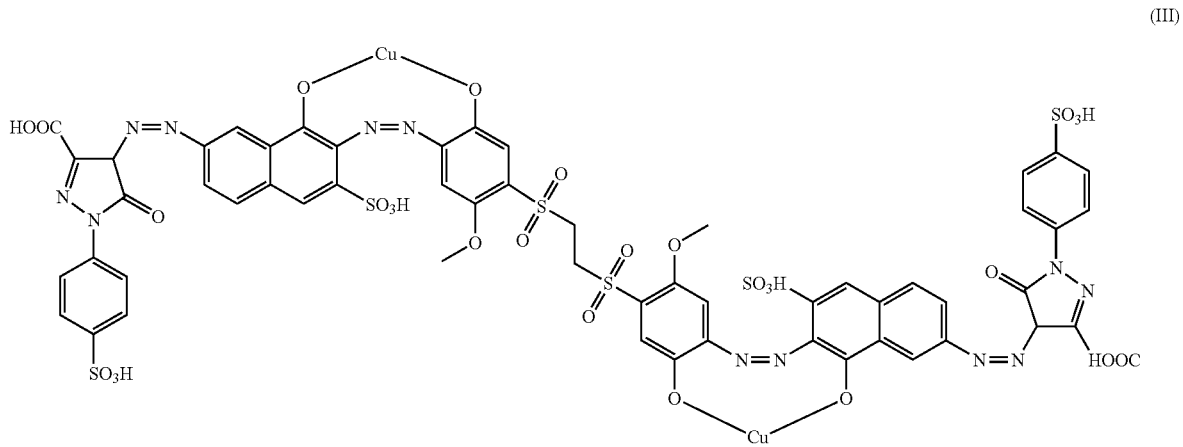

(III)

or mixture of II and III; or mixtures in any proportion of I, II, or III.

3. An ink jet ink according to claim 2 wherein a chromium complex or cobalt complex black dye having an a* value of>0 at 1.0 Status A visual density is combined in a mixture with structures I, II or III.

4. An ink jet ink according to claim 1 wherein the second metal complex black dyes is a metal complex bisazo black dye of the following structure:

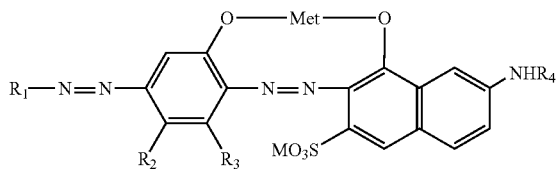

where $R_1$ is unsubstituted or substituted phenyl or unsubstituted or substituted naphthyl; $R_2$ is H, alkyl, substituted alkyl, alkoxy, substituted alkoxy all with 1 to 18 C atoms, amino, substituted amino, halo, trifluoromethyl, carboxy, sulfo, carbamido, alkylcarbonylamino, arylcarbonylamino; or $R_2$ forms together with $R_3$ and the phenylene ring a 1,4-naphthylene moiety, which can be unsubstituted or substituted in position 6 or 7; $R_3$ is hydrogen or forms together with $R_2$ and the phenylene ring a 1,4-naphthylene moiety, which can be unsubstituted or substituted in position 6 or 7; $R_4$ is H, alkyl, substituted alkyl, all with 1 to 18 C atoms, cycloalkyl, unsubstituted or substituted heterocyclic alkyl, unsubstituted or substituted aryl, unsubstituted or substituted aralkyl, saturated or unsaturated aza and/or oxa and/or heterocyclic radicals; M is hydrogen, a metal cation, an ammonium cation, or an ammonium cation substituted with alkyl, alkoxyalkyl or hydroxyalkyl radicals each having 1 to 12 C atoms; and Met is Cu, Ni, or Zn; or a trisazo metal complex black dyes of the following structure:

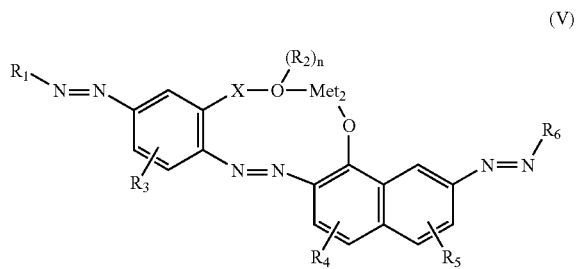

where $Met_2$ is a metal atom; $R_1$ is a phenyl or naphthalene radical substituted by 1, 2 or 3 substituents selected from the group consisting of OH, O(C1–C6)-alkyl, COOM, $SO_3M$ and $NH_2$; $R_2$ is C1–C6 alkyl, n is 0 or 1, X is a chemical bond or —CO— or —$SO_2$—; $R_3$ is H, methyl or O(C1–C6) alkyl; $R_4$ and $R_5$ are each H, COOM or $SO_3M$; $R_6$ is a phenyl, pyridyl or pyrazole radical substituted by 1,2 or 3 substituents selected from the group consisting of OH, O(C1–C6) alkyl, COOM, $SO_3M$, $NH_2$, NHaryl, NHacyl and phenlysulfo; and M is ammonium, H, K, Li, or Na.

5. An ink jet ink according to claim 4 wherein a chromium complex or cobalt complex black dye having an a* value of <0 at 1.0 Status A visual density is combined in a mixture with structures IV or V.

6. An ink jet ink according to claim 1 wherein the yellow dye is an azoaniline yellow dye or metal complex yellow dye or mixtures thereof.

7. An ink jet ink according to claim 6 wherein the yellow dye(s) are selected from the group consisting of C. I. Direct Yellow 86, C. I. Direct Yellow 107, C. I. Direct Yellow 132, C. I. Direct Yellow 173, C. I. Acid Yellow 99 and C. I. Acid Yellow 114 or mixtures thereof.

8. An ink jet ink according to claim 1 wherein the total amount of dyes in the ink composition is from 0.1 wt. % to 15.0 wt. %.

9. An ink jet ink according to claim 8 wherein the total amount of dyes in the ink composition is from 0.4 wt. % to 6.0 wt. %.

10. An ink jet ink according to claim 1 wherein the ratio of the first metal complex black dye(s) to second metal complex black dye(s) in the ink composition is from 1:19 to 19:1.

11. An ink jet ink according to claim 10 wherein the ratio of the first metal complex black dye(s) to second metal complex black dye(s) in the ink composition is more preferably from 1:9 to 9:1.

12. An ink jet ink according to claim 1 wherein the ratio of yellow dye(s) to the sum of the black dyes in the ink composition is from 1:3 to 1:99.

13. An ink jet ink according to claim 12 wherein the ratio of yellow dye(s) to the sum of the black dyes in the ink composition is more preferably from 1:19 to 1:5.

14. An ink jet ink set comprising:
a) a cyan ink comprising a cyan dye and a carrier,
b) a magenta ink comprising a magenta dye and a carrier,
c) a yellow ink comprising a yellow dye and a carrier,
d) a black ink comprising a carrier; and,
  i) at least one first metal complex black dye that when printed alone on a receiving element gives a CIELAB a* value>0 and at 1.0 Status A visual density
  ii) at least one second metal complex black dye that when printed alone on a receiving element gives a CIELAB a* value<0 and at 1.0 Status A visual density; and
  iii) at least one yellow azo-aniline yellow dye or metal complex yellow dye or mixtures thereof.

15. An ink jet ink set according to claim 14 wherein the cyan ink comprises a sulfonated copper phthalocyanine cyan dye or mixture thereof.

16. An ink jet ink set according to claim 15 wherein the cyan dye is C. I. Direct Blue 86, C. I. Direct Blue 199, C. I. Direct Blue 307.

17. An ink jet ink set according to claim 14 wherein the magenta ink comprises a metal complex magenta dye or anthrapyridone magenta dye or azo-naphthol derivative magenta dye or mixtures thereof.

18. An ink jet ink set according to claim 17 wherein the magenta ink is (CAS #251959-65-6), C. I. Reactive Red 23, pacified C. I. Reactive Red 23, C. I. Reactive Red 31, pacified C. I. Reactive Red 31, (CAS #182061-89-8), (CAS #224628-70-0), Acid Red 80, Acid Red 82, CAS#212080-60-9 or mixtures thereof.

19. An ink jet ink set according to claim 14 wherein the yellow ink comprises C.I. Direct Yellow 86, C.I. Direct Yellow 107, C. I. Direct Yellow 132, C.I. Direct Yellow 173, C.I. Acid Yellow 99 or C. I. Acid Yellow 114 or mixtures thereof.

20. An ink jet ink set according to claim 14 which further comprises a light cyan ink and a light magenta ink.

21. An ink jet ink set according to claim 20 which further comprises a light yellow ink and or a gray ink.

22. An ink jet printing method, comprising the steps of:
A) providing an ink jet printer that is responsive to digital data signals;
B) loading said printer with an ink jet recording element comprising a support having thereon an image-receiving layer;
C) loading said printer with an ink jet ink comprising:
   a) at least one first metal complex black dye that when printed alone on a receiving element gives a CIELAB a* value>0 and at 1.0 Status A visual density;
   b) at least one second metal complex black dye that when printed alone on a receiving element gives a CIELAB a* value<0 and at 1.0 Status A visual density; and
   c) at least one yellow azo-aniline yellow dye or metal complex yellow dye or mixtures thereof; and
D) printing on said image-receiving layer using said ink jet ink in response to said digital data signals.

23. An ink jet printing method, comprising the steps of:
A) providing an ink jet printer that is responsive to digital data signals;
B) loading said printer with an ink jet recording element comprising a support having thereon an image-receiving layer;
C) loading said printer with an ink jet ink set comprising:
   a) a cyan ink comprising a cyan dye and a carrier,
   b) a magenta ink comprising a magenta dye and a carrier,
   c) a yellow ink comprising a yellow dye and a carrier,
   d) a black ink comprising a carrier; and,
      i) at least one first metal complex black dye that when printed alone on a receiving element gives a CIELAB a* value>0 and at 1.0 Status A visual density,
      ii) at least one second metal complex black dye that when printed alone on a receiving element gives a CIELAB a* value<0 and at 1.0 Status A visual density; and
      iii) at least one yellow azo-aniline yellow dye or metal complex yellow dye or mixtures thereof; and
D) printing on said image-receiving layer using said ink jet ink in response to said digital data signals.

* * * * *